United States Patent
Klein et al.

(10) Patent No.: US 6,792,526 B1
(45) Date of Patent: Sep. 14, 2004

(54) CONTROL SYSTEM FOR CONTROLLING THE STARTING UP OF A DISTRIBUTED SYSTEM

(75) Inventors: Holger Klein, München (DE); Bernd Niederau, Holzkirchen (DE); Jürgen Niessen, Bad Heilbrunn (DE); Klaus Wich, München (DE)

(73) Assignee: Siemens Aktiengesellschaft, Munich (DE)

( * ) Notice: Subject to any disclaimer, the term of this patent is extended or adjusted under 35 U.S.C. 154(b) by 612 days.

(21) Appl. No.: 09/716,899

(22) Filed: Nov. 20, 2000

Related U.S. Application Data (63) Continuation of application No. PCT/EP99/03046, filed on May 4, 1999.

(30) Foreign Application Priority Data

May 19, 1998 (EP) .............................................. 98109102

(51) Int. Cl.⁷ .............................................. G06F 15/177
(52) U.S. Cl. ................................. 713/1; 713/2; 709/222
(58) Field of Search ........................ 713/2, 1; 370/244; 709/222

(56) References Cited

U.S. PATENT DOCUMENTS

| | | | | |
|---|---|---|---|---|
| 4,912,698 A | * | 3/1990 | Bitzinger et al. | 370/244 |
| 5,568,375 A | | 10/1996 | Rausch | |
| 5,794,031 A | * | 8/1998 | Nakadai | 713/2 |
| 5,951,682 A | * | 9/1999 | Clark et al. | 713/1 |

FOREIGN PATENT DOCUMENTS

DE 3130409 A1 2/1983

OTHER PUBLICATIONS

International Publication No. 97/01815 (Clark et al.), dated Jan. 16, 1997.

* cited by examiner

Primary Examiner—Thomas Lee
Assistant Examiner—Albert Wang
(74) Attorney, Agent, or Firm—Laurence A. Greenberg; Werner H. Stemer; Ralph E. Locher (57) ABSTRACT

A control component for controlling the booting up of a complex computer system is described. The control component is configured such that it carries out its task irrespective of changes to the architecture/topology of the computer system. This task is carried out in that the control component controls the booting up of the system on the basis of data that are taken exclusively from a system database.

9 Claims, 6 Drawing Sheets

CONTROL SYSTEM FOR CONTROLLING THE STARTING UP OF A DISTRIBUTED SYSTEM

CROSS-REFERENCE TO RELATED APPLICAITON

This is a continuation of copending International Application PCT/EP99/03046, filed May 4, 1999, which designated the United States.

BACKGROUND OF THE INVENTION

Field of the Invention

Topologically flexible and large, distributed systems (i.e. computer systems) require that the process of starting up (i.e. booting up) the individual components be coordinated when such systems are started up overall (initial commissioning or restarting of the overall system in order to neutralize hardware/software faults). In the following text, the term component has the following meaning: a processor with a software function or with a number of software functions, or a group of processors which each contain one, several or mixed software functions. The term starting up of a component refers to the loading of the software function or functions in the hardware part of the component, and the initialization and activation of the software function or functions. (It is necessary to distinguish from this the process of starting up software processes on an individual platform whose operating system is already in operation, so that process activity is feasible, as described, for example, in the document International Patent Disclosure WO 97/01815.

A coordinated starting up of the system is required, inter alia, since the components to be activated require software functions (code and data) which they need to start themselves up and to start up components downstream from them in the hierarchy. A starting-up process staggered in time and topologically during an overall start-up process is thus necessary, in contrast to local or other networks in which the network components register with their master/server, or attempt to do so until the master/server can be reached.

One example of large distributed systems is switching systems for broadband users (EWSX or, in EWSD, the SSNC). Different software functions are distributed between a number of processors in these systems. Furthermore, these systems are characterized by a distributed operating system and by a distributed database. Different component groups have direct or indirect relationships with other components in the system during an overall start-up process.

First, the customers require topologically highly different systems, that is to say the number of processors in the system and their linking structure may vary, and, second, the customers require functionally highly different systems, that is to say the distribution of the software functions between the various processors in the system depends on the customer requirements.

Furthermore, new components are constantly being developed, which are integrated into the existing system as development progresses.

What has been stated above results in the following requirements for the control software for an overall start-up process.

The control software (start-up control component) for coordination of the starting-up process (other terms used for "starting-up": activation, booting up, starting) of the overall system should be configured such that it manages the process of starting up the system independently of changes to the architecture/topology.

In particular, the starting-up process should be configured to be independent of hardware so that, for example, the control software also copes with upgrading or removal of entire parts in the topology. This also results in greater stability and reliability on activation of the overall system.

In the following text, the previous implementation of the start-up process in the specific EWSD switching system from Siemens will be explained in more detail.

Even with EWSD, the number of LTGs, DLUs and their data (ports) are likewise taken from the database, which results in a certain amount of flexibility. However, the following factors must be taken into account:

a) the sequence of activation of the individual components is hard-coded (there are specific activation and synchronization routines for each component);

b) the subsequent activation time for the individual components is hard-coded, that is to say how much progress the already started component can make (satisfaction of the preconditions for starting subsequent components) before the next component group for activation can be started;

c) redundancy principles are hard-coded (message buffer/switching network); and d) the handling of LTG types is different, and is hard-coded.

In the EWSD system, there are also a number of additional aspects (other preconditions), they include:

a) the EWSD has a limited number of processors (6 processors) and a rigid hierarchy of EWSD processors is not a system with a distributed database;

b) the EWSD has a common memory for data (common memory);

c) the EWSD is not a system with a distributed operating system; and d) the EWSD has a rigid function split, that is to say no arbitrary distribution of software functions between the processors.

The system has the below listed disadvantages. If the EWSD is or needs to be upgraded, changes are required in the software which controls the activation (high change complexity: analysis, design, implementation, test . . . ).

With the way in which the system peripherals has so far been taken into operation with hard coding in the EWSD, the future customer requirements with regard to flexibility of switching systems, in particular with regard to the topology, can no longer be satisfied cost-effectively and quickly.

SUMMARY OF THE INVENTION

It is accordingly an object of the invention to provide a control system for controlling the starting up of a distributed system which overcomes the above-mentioned disadvantages of the prior art devices of this general type.

With the foregoing and other objects in view there is provided, in accordance with the invention, a control system for controlling a booting-up of a distributed system containing a number of components. The control system contains a control component for controlling a booting-up process of the distributed system; and a database connected to the control component and storing data related to each of the components of the distributed system. The data describe characteristics of the components in terms of control of the booting-up process. The control component is programmed to read the data relating to a boot-up time for each of the components from the database, and uses the data which have been read to control the booting-up process of the distributed system.

In accordance with an added feature of the invention, the control component controls the booting-up process of the distributed system in that it is programmed to use the data which have been read first to filter out the components which it will include in the booting-up process, and second to determine an activation sequence of the components that have been filtered-out.

In accordance with an additional feature of the invention, the data that have been read out contain information about at least one of subdivisions of component groups, processors, units, and platforms in hierarchies.

In accordance with another feature of the invention, the data that have been read out contain information about component statuses.

In accordance with a further feature of the invention, an interface through which an operator can use a command to select a scope of a component is provided.

In accordance with a further added feature of the invention, the control component is loaded with control software and, in order to identify a total failure before carrying out the booting-up process, the control software asks whether the total failure has occurred. In which case a total failure identification then uses the component statuses to determine whether an activation of an overall system to be carried out can provide a desired software function of a customer as an entity.

In accordance with a concomitant feature of the invention, each of the components of the distributed system is a processor having at least one software function or each of the components of the distributed system are a group of processors having at least one software function.

Other features which are considered as characteristic for the invention are set forth in the appended claims.

Although the invention is illustrated and described herein as embodied in a control system for controlling the starting up of a distributed system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

A customer for a distributed system first defines his overall system needs jointly with the manufacturer. In this case, the number and type of connections (subscribers, trunks, links) play a critical role, that is to say, in the end, the type and number of components to be activated are defined (components which the manufacturer already has or may still need to develop). For example, the performance requirement parameter "throughput" (switching capacity) also governs the size and nature (type of component groups) in the switching matrix (20, 40, 160 Gbit) and the number of processors with switching tasks. Other factors such as the network topology and redundancy principles in the switching system specified by the customer likewise influence the topology of the component groups.

The information (or data) about the component groups to be activated for starting up the system, their components and associated further data (in particular data relating to control of the sequence and the timing of the starting-up process) are determined by the control software from the database.

The process of "determination from the database" takes place in a number of stages (see also further below the pseudo code for "Read data").

Stage 1:

"Files" (PROFILEs) exist which contain the object model (framework or object classes with characteristics) of the database. A software complex uses these files to produce the database. While the PROFILE object classes already include the entities (elements) (analysis time, see above), other object classes are, however, likewise produced at this stage with their characteristics, but are still empty.

Stage 2

The entities (for example components) in the other object classes are then introduced step-by-step, for example by the operator. The appropriate PROFILE object class is then used to allocate a component to a component group.

The databank system is mapped using logic object classes with specific characteristics, for example the component group PROFILE object class (a quasi-semi-permanent table), which contain entities. The control software reads, for example, all the entities (components) produced from a PROFILE object class, with a PROFILE object class being specified for analysis and development time (and before the production of the APSs by a) customer, b) marketing, c) system engineering and/or d) development), and not being changeable dynamically. The components in so-called component groups, which are also used for the initial population of the databank system are produced by entity formation from the PROFILE object classes. That is to say, these object classes are used to "fill out" (not produce) further object classes, whose data and entities are dynamically changeable. For example, the operator can add or remove components, or edit the data in the components, during system operation.

Using data from further object classes, the control software filters/determines the so-called "filtered components" from the components contained in the database (depending on the nature of the overall system, the only components in specific component groups which are included in the starting-up process are those which are required for a system function (this is the concern of the operator)). Only the filtered components are activated by the control software for the starting-up process.

The filtering takes place via approved statuses of the existing components, with the approved statuses depending on a variable scope (that is to say, the scope is used to define the status marked for a component of the database, or the statuses marked for a component, which an existing component uses for the starting-up process). The standard filtering allows only those components whose status is marked as "active" in the database. If standard filtering is inadequate to ensure successful start-up, then the scope can be extended, for example by the operator (administrator) and/or automatically, that is to say by the system.

The reason for the expansion is that faulty components, that is to say components which are not marked as "active", may be, for example, hardware which has become too hot or is sporadically faulty, or components whose status recording or status marking has been changed by the fault identification software from "active" to "faulty". The true status of these components could now nonetheless be "active" so that inclusion of these components in the start-up would now prevent a total failure. A similar situation could also occur in the case of hardware faults caused by other components which have now been replaced but which were interrupted by a system-wide start-up stage before the individual configuration process, or in the case of downstream components (which are not actually marked as being faulty but are marked as "not accessible") if the upstream component had been defective but had in the meantime been replaced. In these situations as well, activation could now still lead to successful start-up.

The definition of statuses is required, inter alia, for maintenance (MTC). The control software administers these statuses.

In general, for understanding:

Classification of components statuses:

Administrative status (controlled by the operator)

Fault status (controlled by the system)

Operative status (controlled by the system)

| Semi-permanent statuses | | Transient statuses |
|---|---|---|
| Admin status | Fault status | Operative status |
| UBL (unblocked) | CLR (clear = ok) | ACT (active) |
| UBL | FLT (faulty = slightly faulty) | OOP (out of operat.) |
| UBL | UNA (unavailable) | OOP |
| MBL (MTC blocked) | * | OOP |
| RSV (reserved) | * | OOP |

Various scopes can thus be selected/used (see above).

a) normal boot-up=all components annotated "active";

b) initial boot-up=as noted in a) and all components annotated as "reserved";

c) problem situation can be resolved better by extending the scope by the operator or system-internally;
   as noted in a) and all components annotated as "unavailable";
   as noted in a) and all components annotated as "unavailable" and "MTC blocked".

It may also be possible to compensate for operator faults. For example, deactivation of a central component (MBL= maintenance blocked)→boot-up escalation→MBL components also taken down in the event of a total failure.

The operator can use a command to extend the previously defined scope to an extended scope, that is to say the starting-up process will then also include those components which are marked as faulty and/or reserved and/or not accessible.

Furthermore, the control software described here can extend its scope automatically if it finds, in conjunction with the total failure identification, that the starting-up process to be carried out by it for the overall system cannot provide the system operation required by the customer, as an entity. The interaction operates as now described.

During the booting-up process, the control software asks the total failure identification a number of times (for example before commencement of the start-up process, during the starting-up process (once all the components involved in the starting-up process have responded physically) or before a longer-lasting retrospective action on components which have not been successfully activated is reached). The first question is asked before commencement of the start-up process. When first asked, the total failure identification considers all the components to be activated for starting up the overall system and uses their statuses (it takes the statuses from the database) to check whether the activation to be carried out can provide the overall system functions desired by the customer. If the check answers this question with "no", then a total failure is identified, the scope is extended (see above) and the total failure identification is then called up once again (not immediately afterward, but only during the start-up process, see above). The question is not asked immediately since the statuses are not updated immediately and the total failure identification would give the same result. The statuses are updated in the course of the activation process.

The components to be activated are split into groups, so-called component groups, for the analysis and development time (see above) on the basis of their type. Each component group (A, B. C, D) may include any desired number (which can be determined by the customer) of components of the same component type (see FIG. 1). If the number of components in a (component) group reaches a maximum value (governed by software), internal subgroups of the same component type are formed, and the internal start-up sequence time is started in a corresponding manner (also a data item in the database for a component group).

Figure 1:
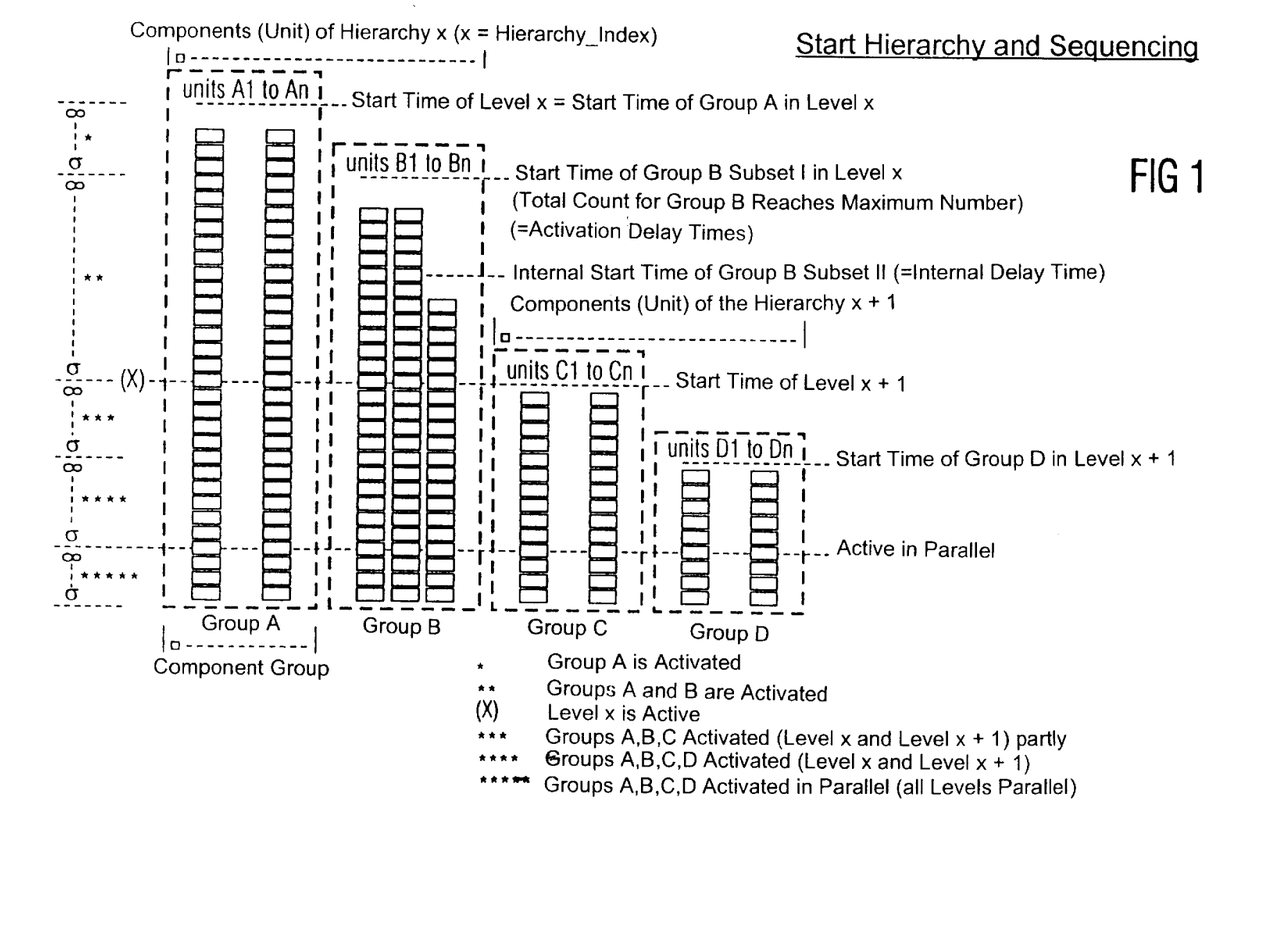
FIG. 1 is a illustration of component groups of the distributed system and associated start times according to the invention.

Furthermore, the component groups are split into hierarchies for the analysis and development time, and sequences between the hierarchies are determined as noted in FIG. 1.

The process of splitting them into hierarchies ensures that activation of a subsequent hierarchy cannot start until all the components in a hierarchy which has already been "started", that is to say which is in the activation phase, satisfy the preconditions for starting the activation of the subsequent hierarchy.

A subsequent activation time is defined within hierarchies, that is to say between component groups (components report to the control software at defined times (synchronization points) of the present status of activation (active or no longer active). The subsequent activation time defines the synchronization point or activation status. Once all the components in a component group, or all the component groups in a component hierarchy, have reported a corresponding activation status/synchronization point, the start of activation of a subsequent component group or component groups is, for example, possible/necessary. Component groups within a hierarchy can also be activated in parallel by setting the subsequent activation time to "do not wait").

In FIG. 1, group A is initially activated as shown by the symbol *. Then groups A and B are activated as shown by the symbol  leading to level X being active. The symbol * shows that groups A, B and C are now active. The symbol ** shows that groups A, B, C and D are active and symbol *** shows that the groups are active in parallel.

The invention furthermore allows the redundancy principle (for example in the EWSX line) during the overall system boot-up process in order to maintain stable links (PVCs). This is ensured by a plane-by-plane start-up process (page by page: first page 0, then page 1 of AMX ultimate, ASN-Asynchronous Switching Network and AMX-dependant, see FIG. 2A). However, the control software also copes with simultaneously starting up the planes of other systems (for example of the EWSD system). This is easily achieved by another PROFILE (=different version) with different data (hierarchies, activation sequences, . . . ).

Figure 2A:
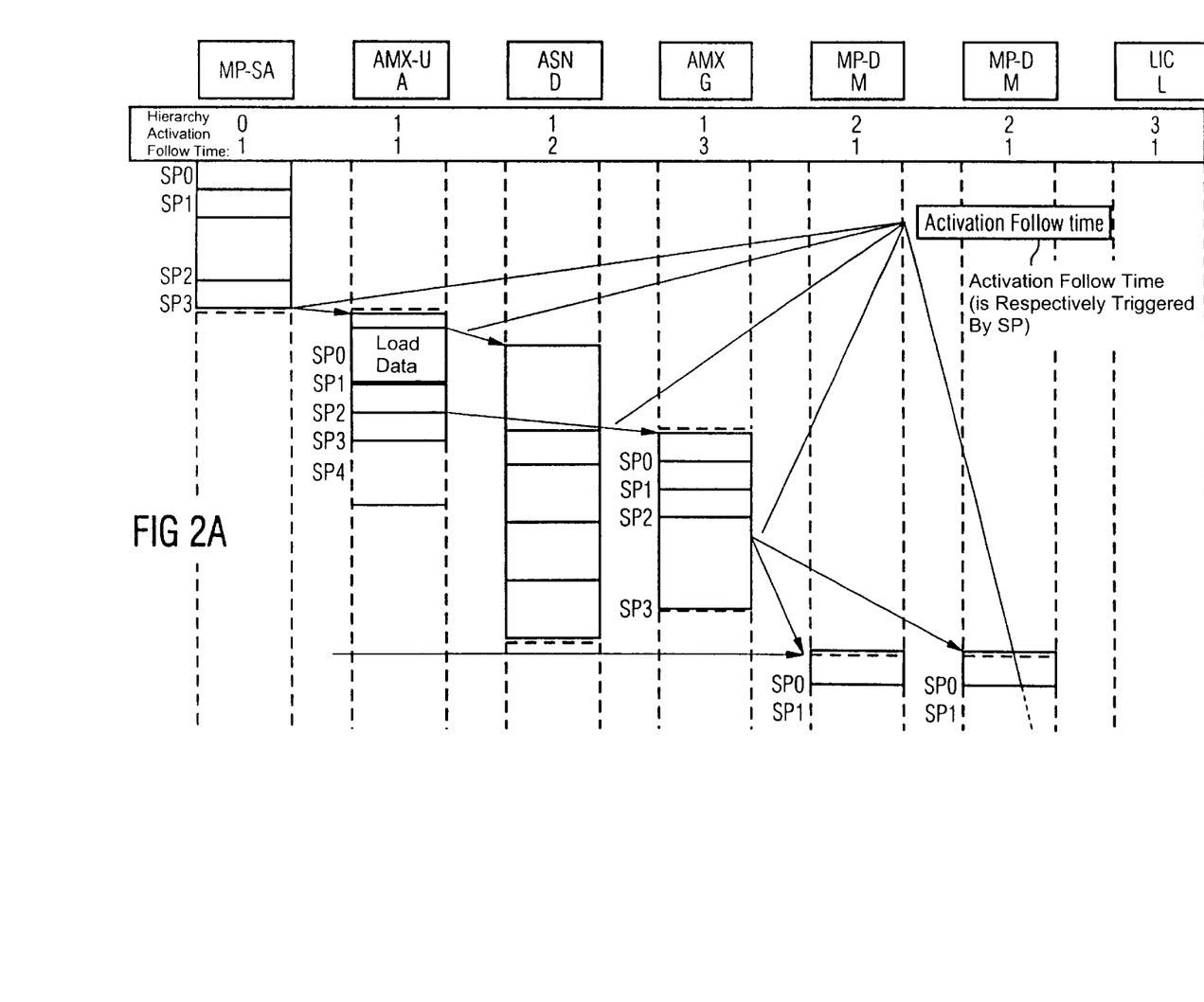
FIGS. 2A and 2B are graphs illustrating the starting times of components of the distributed system.
Figure 2B:
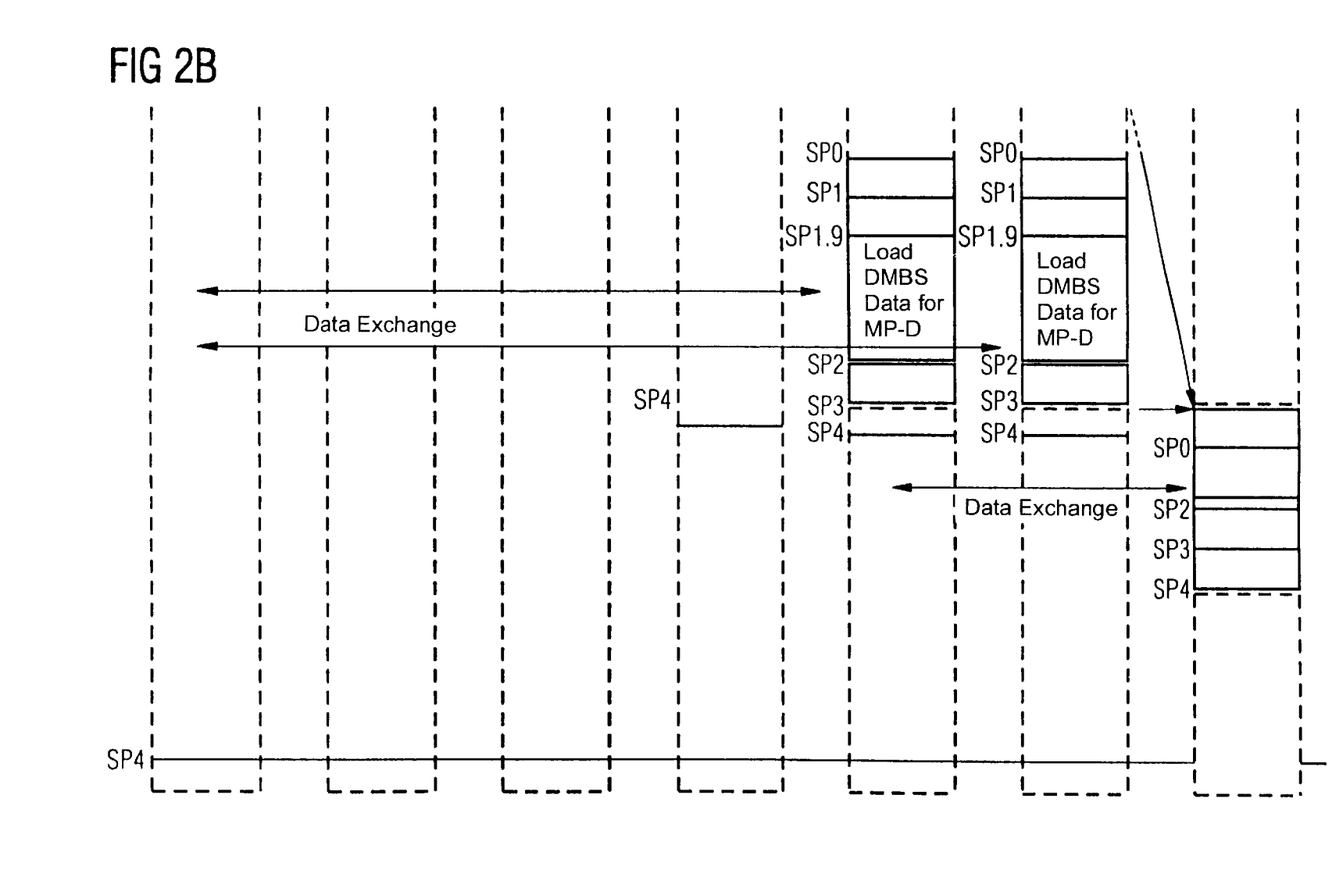

FIGS. 1, 2A and 2B show the previous statements in graphical form.

This is followed, by way of example, by pseudo codes for "read data" and "start activation of the peripherals", which are comprehensible in comparison with the figures and to what has been said above.

Pseudo code for "read data":

Read all component groups with associated (activation control) data (for example hierarchy, hierarchy sequence, subsequent activation time, . . . )
DO FOR all component groups (A to D)
   filtered component group corresponding to scope and read filtered components in the component group with associated (activation control) data DO FOR all read components with extended scope
      read further data (for example redundancy principles: because of target status=active or standby)
   OD
OD Pseudo code for "Start activation of the peripherals":
DO FOR EVER
  IF the component groups have not yet all been started DO FOR all component groups (A to D)
    IF conditions for starting the component group (I) are satisfied, that is to say (all components/groups in hierarchy level x-1 have reached the subsequent activation time (SP)
      OR
      have failed)
      OR
    within the hierarchy in subsets (for example in the component group B subset 1),
    previous subsets have reached the internal subsequent activation time (SP)
      OR
    have failed)
    OR
    within the hierarchy (for example in component group D), the previous component group has
    reached the subsequent activation time (SP)
      OR
    has failed)
    THEN
    start of activation of the component group (I)
    ELSE
      /* next component group */
    FI
RECEIVE MESSAGES
  CASE Message in Buffer 1; Process message 1
      /* e.g. synchronization */
  CASE Message in Buffer 2
  . . .
  CASE Message in Buffer n
OD The invention has the below listed advantages.

a) Virtually an unlimited number of components are possible.

b) The solution can also be used for systems with a distributed database and a distributed operating system (for example EWSX, SSNC, see further below). A correct control of the software functional distribution to the components is ensured by hierarchies and sequences of component groups.

c) The solution allows functions to be distributed as required.

d) All data are taken from the database.

e) The boot-up/activation of the system is data-controlled, to be precise both with regard to the activation sequence and with regard to the subsequent activation times.

f) Flexible extensions or amendments to the system extent/topology are possible without having to modify the software (even entire parts of components or new versions with new components may be included, from the purely software point of view, at any desired point in the topology). In consequence, stability improvements in subsequent versions, test complexity low . . .

g) Small and large, flexible and topologically unknown systems can thus be operated by software.

h) Automatic or customer-initiated extension of the scope of the units to be activated is possible.

The important features of the invention are now listed.

a) The formation of component groups (=hardware component with associated software function) with the same characteristics.

b) Formation of hierarchies which take account of the relationships between the component groups and the start-up sequence.

c) Subsequent hierarchy check of the activation progress (=start conditions satisfied?) of all components in the previous hierarchy for starting further components The features provide, inter alia, the following advantages:

a) Hardware independence: it is not important what the components are called, only the relationships between them.

b) Parallel start-up is possible within the hierarchies.

c) Hierarchies improve the deterministic booting-up process (boot-up should as far as possible be deterministic in order to improve the probability of successful start-up).

Further important features of the invention include:

a) Definition of sequences for component groups within the hierarchy level;

b) Definition of starting times for subsequent activations of component groups within a hierarchy level. This is defined in the requirement phase, analysis (see above). It depends on the software functions of the components, for example a processor must have specific data (at a specific time (synchronization point SP)) before the next component group can be started and loaded with parts of such data, or, for example, maintaining stable links (PVCS) within a system-wide boot-up process, for example after a hardware reset, is possible only if those components which are redundant achieve activation progress such that they can be switched to.

c) Assessment of statuses.

d) Complete mapping of such data into the databank object model.

The information (separated from the control software) allows the control software to be maintained in a very general form, that is to say highly generically, as a result of which it is suitable for activation of any desired topologies.

Figure 3:
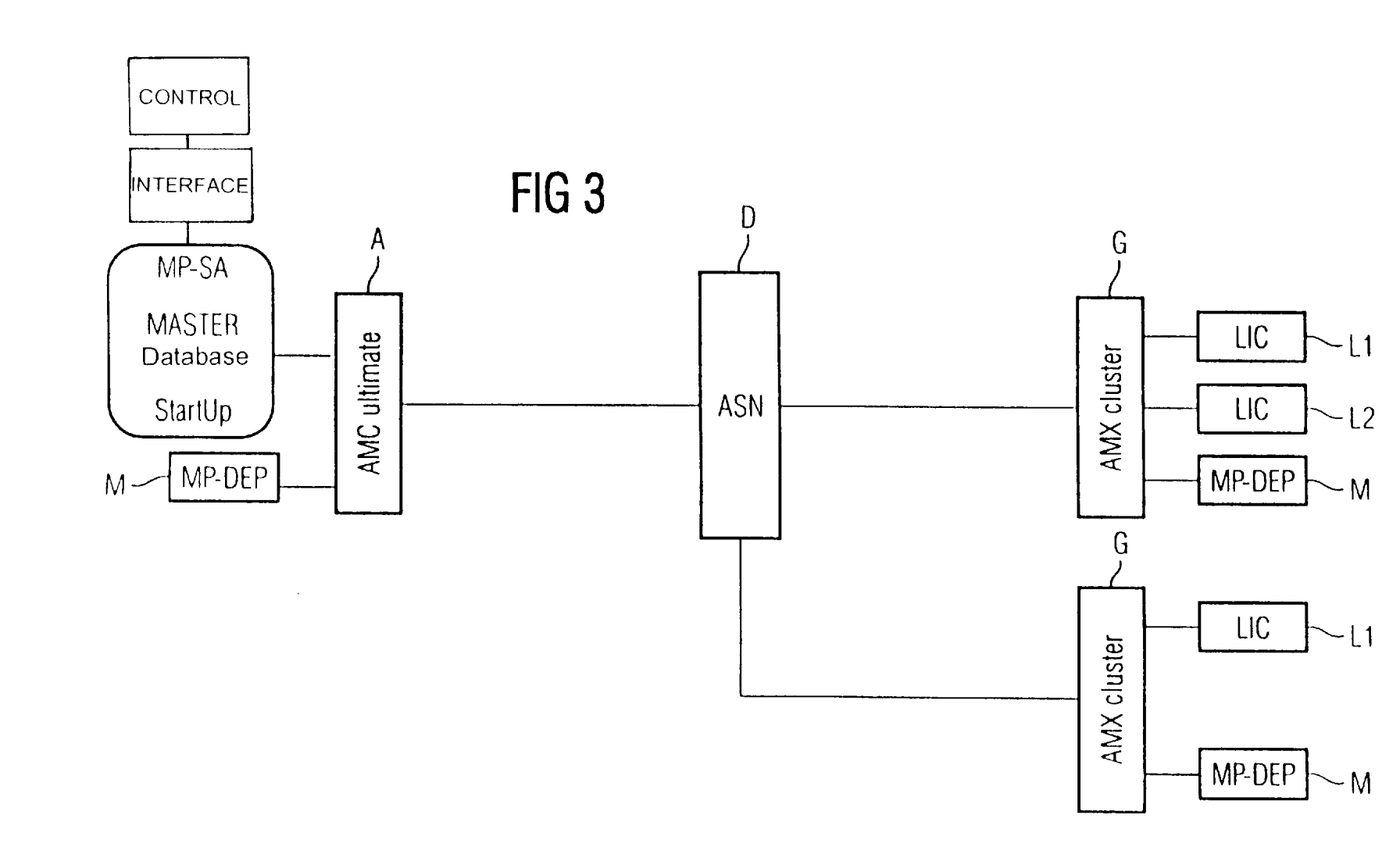
FIG. 3 is a block diagram of an EWSX system.
Figure 4:
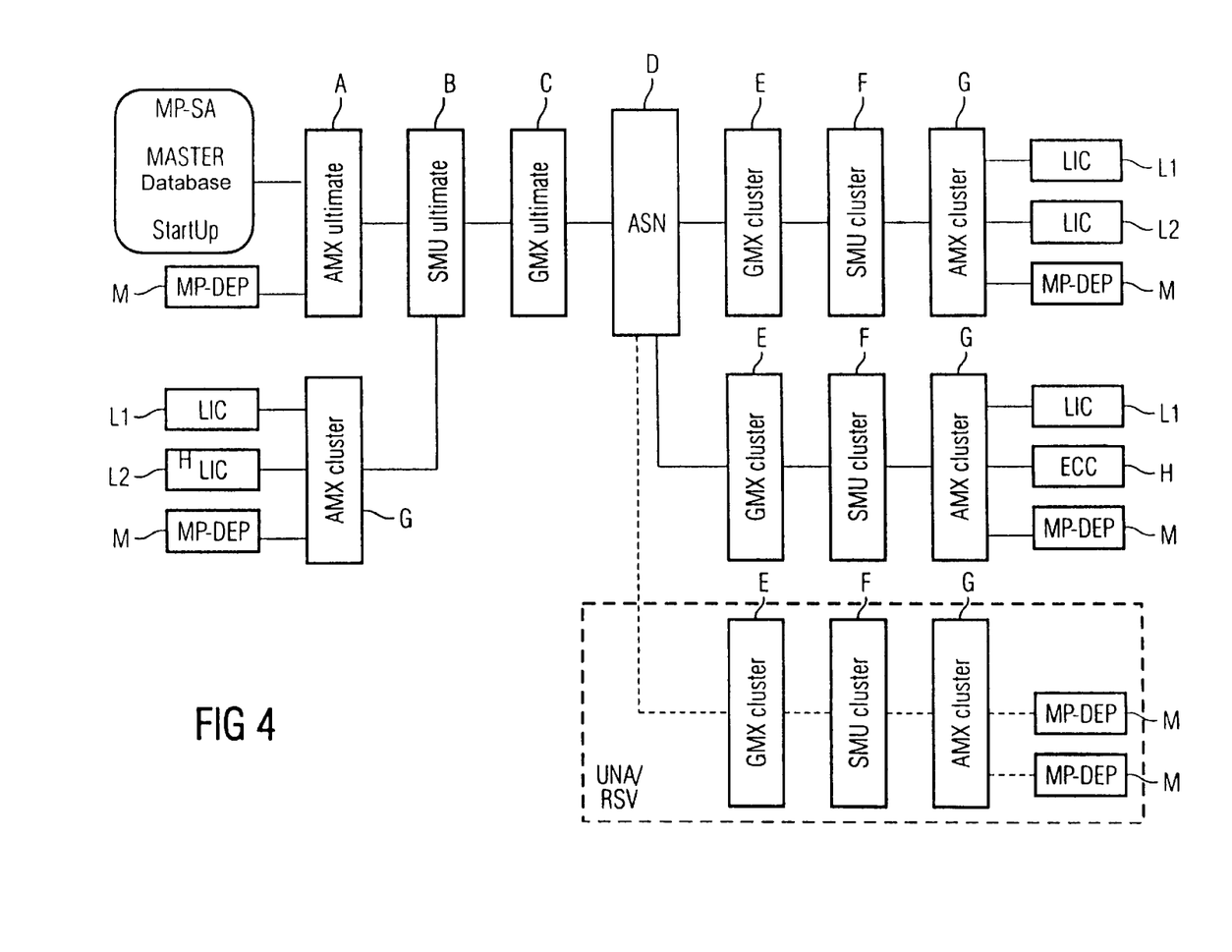
FIG. 4 is a block diagram of a second embodiment of the EWSX system.
Figure 5:
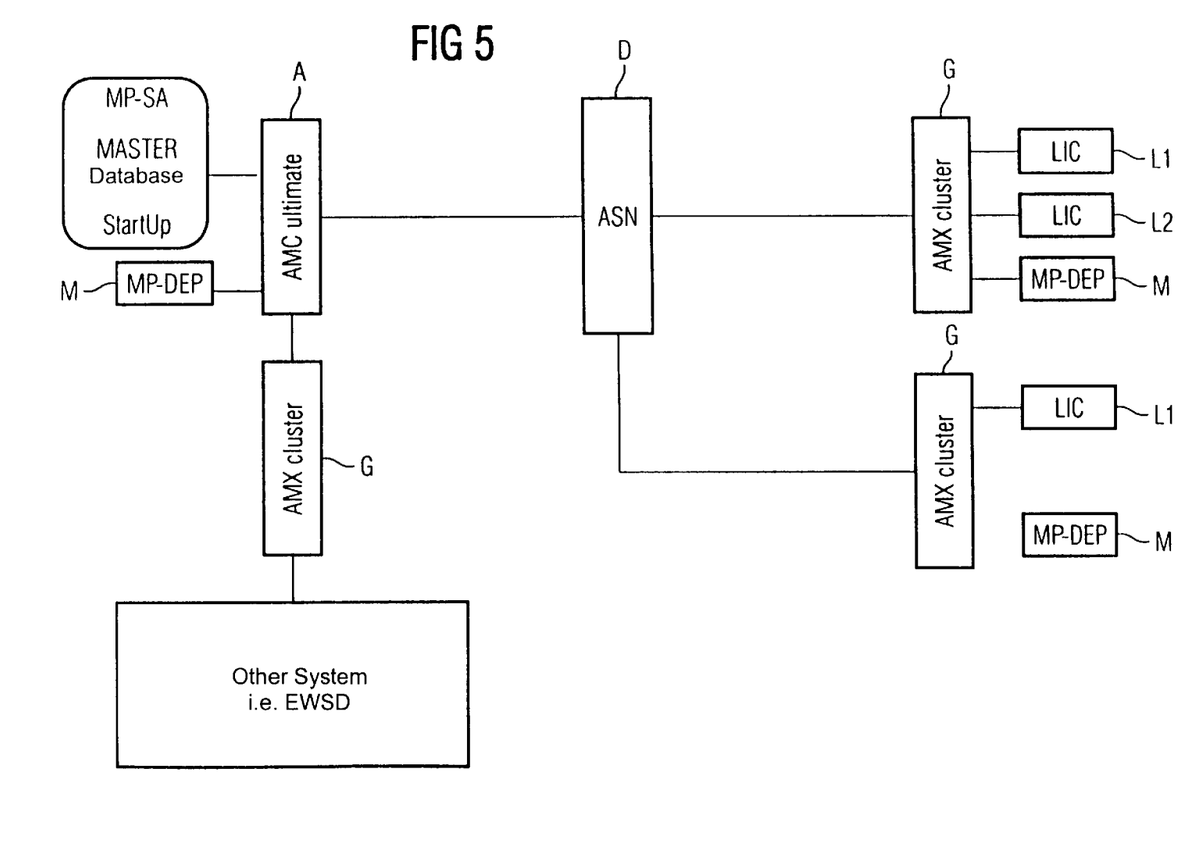
FIG. 5 is a block diagram if an SSNC system.

The following examples in FIGS. 3, 4 and 5 are intended to illustrate the various topologies of three system examples, which can be operated with the same control software.

FIGS. 3 and 4 show the topologies of variants of an example of an EWSX system, using the component start-up sequence that has already been illustrated in FIG. 2A. FIG. 3 shows a control component CONTROL connected to the master data base MP-SA. An interface INTERFACE is provided so that an operator can use a command to select a scope of the component.

FIG. 5 shows the topology of an example of an SSNC system.

The invention can also be used in other technical systems, for example fully automatic store administration
        starting up the computers
            data distribution to conveyor belts/equipment connected to them
            starting up transportation units . . .
        German federal railroads

We claim:

1. A control system for controlling a booting-up of a distributed system containing a number of components, comprising:

a control component for controlling a booting-up process of the distributed system; and a database connected to said control component and storing data related to each of the components of the distributed system, the data containing information about a component group to which a component belongs and information about a hierarchy to which the component group is assigned and a sequence of the booting-up process being dependent on the hierarchies;

said control component programmed to read the data from said database, at a start of the booting-up process, and uses the data which have been read to control the booting-up process of the distributed system.

2. The control system according to claim 1, wherein said control component controls the booting-up process of the distributed system in that it is programmed to use the data which have been read first to filter out the components which it will include in the booting-up process, and second to determine an activation sequence of the components that have been filtered-out.

3. The control system according to claim 1, wherein the data that have been read out contain information about at least one of subdivisions of component groups, processors, units, and platforms in hierarchies.

4. The control system according to claim 1, wherein the data that have been read out contain information about component statuses.

5. The control system according to claim 1, including an interface through which an operator can use a command to select a scope of a component.

6. The control system according to claim 4, wherein said control component is loaded with control software and, in order to identify a total failure before carrying out the booting-up process, the control software asks whether the total failure has occurred, in which case a total failure identification then uses the component statuses to determine whether an activation of an overall system to be carried out can provide a desired software function.

7. The control system according to claim 1, wherein each of the components of the distributed system is a processor having at least one software function.

8. The control system according to claim 1, wherein each of the components of the distributed system are a group of processors having at least one software function.

9. The control system according to claim 1, wherein a time of activation of the booting-up process is determined between the component groups within a hierarchy.

* * * * *